March 18, 1969   G. A. JAMES   3,433,132
VACUUM MOTOR
Filed Nov. 28, 1966

INVENTOR
GEORGE A. JAMES

BY Barnes, Kisselle, Raisch & Choate
ATTORNEYS

United States Patent Office 3,433,132
Patented Mar. 18, 1969

3,433,132
VACUUM MOTOR
George A. James, Dearborn, Mich., assignor to F & E Manufacturing Company, Wyandotte, Mich., a corporation of Michigan
Filed Nov. 28, 1966, Ser. No. 597,372
U.S. Cl. 92—48                                     8 Claims
Int. Cl. F01b *19/00, 7/00, 21/02*

ABSTRACT OF THE DISCLOSURE

A vacuum motor comprising a housing between which a pair of diaphragms are clamped to divide the housing into three chambers. An actuator is fixed to one of the diaphragms and extends exteriorly of the housing. A stem is fixed to the other of the diaphragms and extends into a closed end opening in the actuator. Interengaging means are provided between the stem and the actuator so that when the stem is moved in one direction the actuator is moved in unison therewith. Vacuum is supplied selectively to two of the chambers.

---

This invention relates to vacuum motors and particularly to vacuum motors that are utilized for positioning elements such as doors or dampers in heating and air conditioning systems of automobiles.

Among the objects of the invention are to provide an improved vacuum motor for moving an element such as a heater door or damper in one of three positions with accuracy; which is readily easily manufactured and assembled; and which will operate efficiently for long periods of time.

Basically, the vacuum motor disclosed herein comprises a housing between which a pair of diaphragms are clamped to divide the housing into three chambers. An actuator is fixed to one of the diaphragms and extends exteriorly of the housing. A stem is fixed to the other of the diaphragms and extends into a closed end opening in the actuator. Interengaging means are provided between the stem and the actuator so that when the stem is moved in one direction the actuator is moved in unison therewith. Vacuum is supplied selectively to two of the chambers. More specifically, the housing comprises a pair of sections and includes an adapter ring so that the diaphragms are clamped between the adapter ring and portions of the sections of the housing. The adapter ring includes recesses into which portions of one section of the housing are deformed and also includes one of the vacuum inlets.

Figure 1:
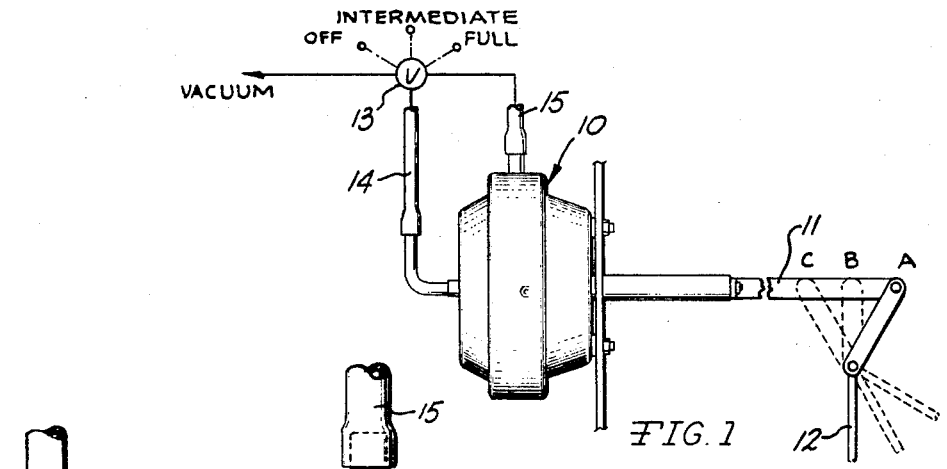
Figure 2:
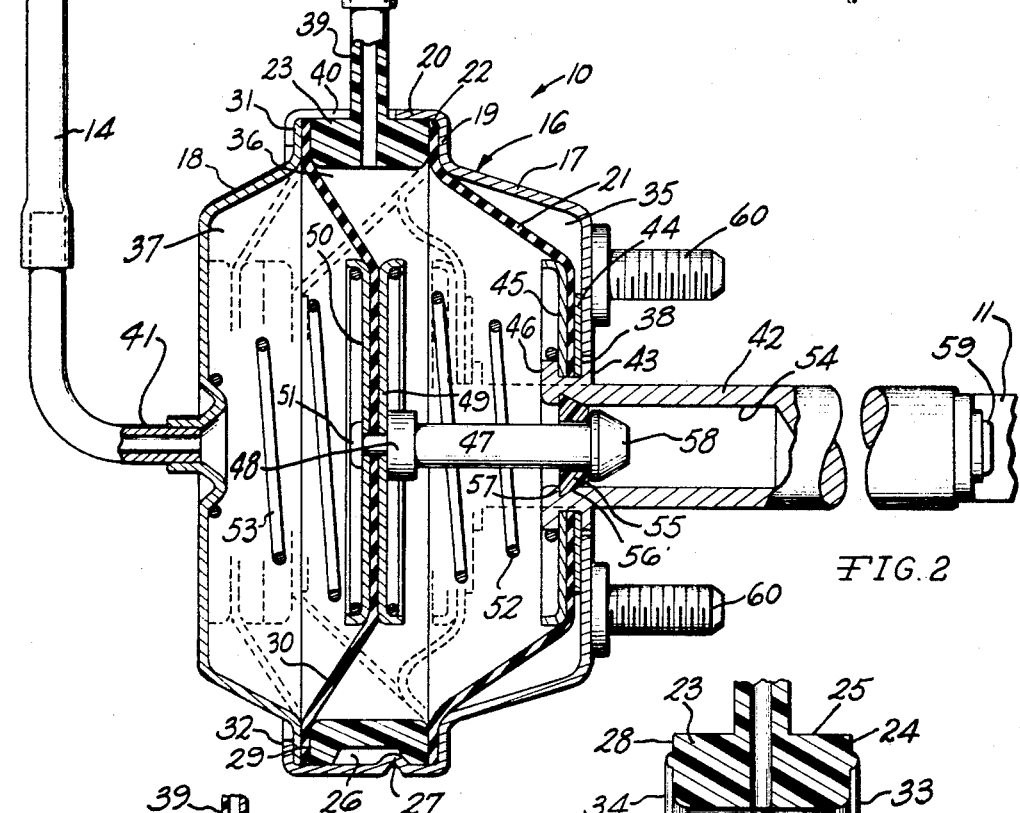
Figure 3:
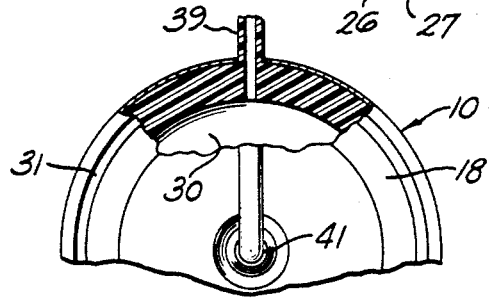
Figure 4:
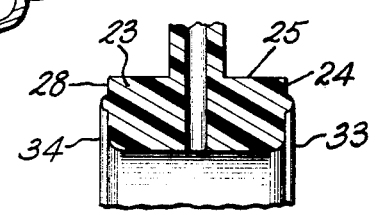

In the drawings:
FIG. 1 is a partly diagrammatic view of the vacuum motor embodying the invention.
FIG. 2 is a longitudinal sectional view through the vacuum motor embodying the invention.
FIG. 3 is a fragmentary part sectional end elevational view.
FIG. 4 is a fragmentary sectional view of a portion of the vacuum motor shown in FIG. 2 on an enlarged scale.

Referring to FIG. 1, the vacuum motor 10 embodying the invention is utilized to control the movement of a lever 11 which in turn pivots an element 12 such as a heater door or damper. The vacuum motor 10 is controlled by a valve 13 which may be positioned in the case of an automobile on the dashboard and have three positions designated "off," "intermediate" and "full." The valve 13 controls the application of vacuum to one of two lines 14, 15 of the vacuum motor 10. The application of the vacuum on the motor 10 determines the position of the lever 11. In the "off" position of the valve, the vacuum motor 10 positions the lever 11 at the position designated A. In the "intermediate" position vacuum is applied to the passage 14 and the vacuum motor moves the actuator 11 to position B. In the "full" position, vacuum is applied to the passage 15 and the vacuum motor moves the lever to the position C.

Referring to FIGS. 2–4, the vacuum motor 10 comprises a housing 16 that consists of two sections 17, 18. Section 17 includes an annular radially extending wall 19 and an axially extending wall 20. The periphery 22 of a flexible diaphragm 21 engages the inner surface of the wall 19. An adapter ring 23 of organic plastic material is provided adjacent the interior of the walls 19, 20 and has a radially extending surface 24 that engages the opposite surface of the periphery 22 of diaphragm 21 and a cylindrical peripheral surface 25 that engages the interior of wall 20. The adapter ring 23 is formed with circumferentially spaced recesses 26. Portions 27 of the second section 17 of the housing 16 are deformed inwardly into the recesses 26 to clamp the periphery 22 of the diaphragm 21 between the adapter ring 23 and the wall 19.

Adapter ring 23 includes a second radially extending annular surface 28 against which one surface of the periphery 29 of a second flexible diaphragm 30 extends. The second section 18 of the housing 16 includes a radially extending wall 31 which engages the opposite surface of the periphery 29 of the diaphragm 30. The free end 32 of the wall 20 is deformed radially inwardly to clamp the periphery 29 of the diaphragm 30 between the wall 31 and the retainer ring 23.

As shown in FIG. 4, the surfaces 24, 28 of the retainer ring 23 are formed with annular beads or ribs 33, 34 which are compressed into the material of the diaphragms 21, 30 to insure that an air tight seal is provided It can thus be seen that the diaphragms 21, 30 divide the housing 16 into three chambers 35, 36, 37. The chamber 35 is vented to the atmosphere through an opening 38 in the first section 17. The adapter ring 23 includes an integral radially extending tube 39 that extends through a slot 40 in the wall 20. A line 15 telescopes over tube 39 so that the chamber 36 can be connected to vacuum. The second section 18 includes an axially extending pipe 41 over which the line 14 is telescoped.

As shown in FIG. 2, an actuator 42 is fixed to the diaphragm 21 and extends through opening 38. Specifically, actuator 42 includes a flange 43 that defines a shoulder against which a washer 4 extends. The center of the diaphragm 21 is clamped between washer 44 and another washer 45 and the end 46 of the actuator 42 is deformed radially outwardly to hold the diaphragm in clamped relation to the actuator 42.

A stem 47 is fixed to the second diaphragm 30. Specifically, the stem includes a flange 48 against which a washer 49 rests. The inner portion of the diaphragm 30 is clamped between washer 49 and another washer 50 and the entire assembly is retained in clamped relation by deforming the end 51 of the stem 47 against the washer 50.

A helical spring 52 is interposed between the washers 45, 49 and another helical spring 53 is interposed between second section 18 and the washer 50. As shown the peripheries of the washers 45, 49 and 50 are bent outwardly to facilitate the retension of the springs in the desired position.

The end of the stem 47 extends into a closed end cylindrical opening 54 in the actuator 42. A split ring 55 of low friction plastic material such as nylon surrounds the stem 47 and has a tapered edge 56 that engages an annular groove 57 in the side of the opening 54. The end of the stem is enlarged as at 58 so that when the stem 47 moves to the left as viewed in FIG. 2, it engages the ring 55 and carries the actuator to the left. The actuator 42 is connected to the lever 11 by peening a pin 59 on the actuator over an opening in the lever. Mounting bolts 60 are welded on the second section 18 to facilitate mounting of the motor.

In the manufacture of the vacuum motor, the actuator 42 is first assembled on the diaphragm 21 and the stem 47 is assembled on the diaphragm 30. The diaphragm 21 with the actuator 42 thereon is then positioned within the first section 17 of the housing, the adapter ring 23 is then brought into position and the positions 27 are deformed radially inwardly into the recesses 26 to assemble the diaphragm 21 and the actuator 42 into position on the second section 17. Ring 55 is placed on stem 47. The diaphragm 30 with the stem 47 is then inserted in position by first snapping the ring 55 into the opening 54 and then bringing the periphery 29 of the diaphragm 30 against the retainer ring 23. The second section 18 is then brought into position and the periphery 32 of the wall 20 is deformed radially inwardly to complete assembly.

In use, no vacuum is applied to either of the lines 14, 15 when the valve 13 is in "off" position and the springs 52, 53 hold the diaphragm in the position shown in full lines in FIG. 1.

When the valve 13 is rotated to the "intermediate" position, vacuum is applied through line 14 and tube 41 to evacuate the chamber 37. This draws the diaphragm 30 to the left as viewed in FIG. 1 and causes the stem to engage the ring 55 and carry the actuator 42 and, in turn, the diaphragm 21 to an "intermediate" position. Continued application of vacuum to the line 14 draws the diaphragm against the section 18. This will hold the actuator 42 in the "intermediate" position B shown in FIG. 1.

When the valve 13 is thereafter rotated to the "full" position, vacuum is applied simultaneously to lines 14 and 15 and in turn directly to chambers 36, 37. This reduces the pressure in the chambers 36, 37 and draws the diaphragm 21 and in turn the washer 45 against the washer 49 carrying the actuator 42 in the position C in FIG. 1.

As the actuator 42 moves to the position C, it telescopes further over the stem 47.

It can thus be seen that there has been provided a vacuum motor which efficiently moves an element to one of three positions with accuracy; which is readily assembled and which effectively seals the chambers thereof.

I claim:

1. In a vacuum motor, the combination comprising:
a housing comprising:
a first section and a second section,
said first section having an annular generally radially extending shoulder against which the periphery of a diaphragm is positioned,
a first diaphragm,
an adapter ring,
said ring having at least one inwardly directed recess in the periphery thereof and a radially extending surface engaging the opposite side of the periphery of said first diaphragm,
said first section of said housing being deformed radially inwardly into said recess to retain and clamp said diaphragm between said adapter ring and said first section of said housing,
said adapter ring having an inlet extending from the exterior to the interior of said housing,
a second diaphragm,
said adapter ring having an opposite radially extending surface against which the periphery of the second diaphragm engages,
said second section of said housing having an annular radially extending portion engaging the opposite surface of the periphery of said second diaphragm,
the first section of said housing having a peripheral portion thereof turned radially inwardly against the annular radial portion of said second section of said housing for clamping the periphery of said second diaphragm,
said first and second diaphragms thereby dividing said housing into three chambers,
the first chamber being formed between said first section of the housing on said first diaphragm,
the second chamber being formed between said diaphragms,
and the third chamber being formed between said second diaphragm and said second section of said housing,
said second section of said housing having an inlet extending from the exterior,
an actuator fixed to said first diaphragm,
said first section of said housing having an opening through which said actuator extends,
a stem fixed to said second diaphragm,
said actuator having a closed end opening into which the stem extends,
and interengaging means between said stem and said actuator whereby when said second diaphragm is moved toward said second section of said housing said actuator is also moved inwardly of said housing.

2. The combination set forth in claim 1 wherein said adapter ring is made of organic plastic material.

3. The combination set forth in claim 1 wherein said adapter ring includes annular beads on the radial surfaces thereof which are engaged by the peripheries of the diaphragms.

4. The combination set forth in claim 1 wherein said interengaging means comprises a split ring of low friction plastic material surrounding said stem, said actuator having an annular recess therein in the closed end opening thereof into which said ring is compressed, said enlarged portion of said stem engaging said ring when the stem is moved in a direction toward the second section of said housing.

5. In a vacuum motor, the combination comprising:
a housing comprising:
a first section and a second section,
said first section having an annular generally radially extending shoulder against which the periphery of a diaphragm is positioned,
a first diaphragm,
an adapter ring,
said ring having a plurality of circumferentially spaced inwardly directed recess in the periphery thereof and a radially extending surface engaging the opposite side of the periphery of said first diaphragm,
said first section of said housing being deformed radially inwardly into said recess to retain and clamp said diaphragm between said adapter ring and said first section of said housing,
said adapter ring having an inlet extending from the exterior to the interior of said housing,
a second diaphragm,
said adapter ring having an opposite radially extending surface against which the periphery of the second diaphragm engages,
said second section of said housing having a radially extending wall engaging the opposite surface of the periphery of said second diaphragm,
the first section of said housing having a peripheral portion thereof turned radially inwardly against the annular radial portion of said second section of said housing for clamping said annular wall and thereby clamping the periphery of said second diaphragm,
said first and second diaphragms thereby dividing said housing into three chambers,
the first chamber being formed between said first section of the housing on said first diaphragm,
the second chamber being formed between said diaphragms,
and the third chamber being formed between said second diaphragm and said second section of said housing.

6. The combination set forth in claim 5 wherein said adapter ring is made of organic plastic material.

7. The combination set forth in claim 6 wherein said adapter ring includes annular beads on the radial surfaces thereof which are engaged by the peripheries of the diaphragms.

8. In a vacuum motor, the combination comprising:
a housing,
a pair of members within said housing dividing said housing into three chambers,
said members being movable within said housing to change the size of said chambers,
said housing having an opening in one wall thereof,
said housing having a first inlet extending to the chamber between said members and a second inlet extending into one of the other chambers,
a first spring between said members,
a second spring between said housing and one of said members in one of said other chambers,
an actuator fixed to one of said members and extending through one of said other chambers and said opening in said housing to the exterior,
a stem fixed to the other of said members and extending through the chamber between the members,
said actuator having a closed end opening therein into which said stem extends,
guide means in said actuator for guiding said stem,
said stem and said actuator guide means having interengaging means whereby when said other member moves in one direction toward said second inlet it moves the actuator in unison therewith, said interengaging means comprises a split ring of low friction plastic material surrounding said stem, said actuator having an annular tapered recess therein in the closed end opening thereof into which said ring is compressed, an enlarged portion of said stem engaging said ring when the stem is moved in said one direction,
whereby when vacuum is applied to said second inlet, said second member is moved in unison with said first member inwardly of said housing to bring said actuator inwardly of said housing and when vacuum is thereafter applied to said first inlet, said first member is moved to cause said actuator to move further within said housing telescoping over said stem.

References Cited

UNITED STATES PATENTS

| 3,096,689 | 7/1963 | Kytta | 91—376 |
| 3,146,682 | 9/1964 | Price et al. | 92—99 |
| 3,282,169 | 11/1966 | Leighton | 92—63 X |
| 3,368,459 | 2/1968 | French et al. | 92—97 X |
| 3,373,662 | 3/1968 | Voll et al. | 92—48 X |
| 3,077,186 | 2/1963 | DeBeaubien et al. | 92—48 |
| 3,187,640 | 6/1965 | Young et al. | 92—48 |

FOREIGN PATENTS

| 999,277 | 10/1951 | France. |
| 523,583 | 7/1940 | Great Britain. |

EDGAR W. GEOGHEGAN, *Primary Examiner.*

I. C. COHEN, *Assistant Examiner.*

U.S. Cl. X.R.

92—63, 64, 98; 340—179